United States Patent [19]

Leisinger

[11] Patent Number: 5,444,918
[45] Date of Patent: Aug. 29, 1995

[54] ARRANGEMENT FOR ALIGNING AN APPARATUS UNIT

[75] Inventor: Roger Leisinger, Zurich, Switzerland

[73] Assignee: Mettler-Toledo AG, Greifensee, Switzerland

[21] Appl. No.: 163,844

[22] Filed: Dec. 7, 1993

[30] Foreign Application Priority Data

Feb. 26, 1993 [DE] Germany ............... 9302828.8 U

[51] Int. Cl.⁶ .................................... G01C 9/20
[52] U.S. Cl. ..................... 33/384; 33/387; 33/390
[58] Field of Search ............... 33/285, 299, 354, 365, 33/379, 384, 389, 390, 568, 385, 387, 388

[56] References Cited

U.S. PATENT DOCUMENTS 4,848,003  7/1989  Westphal et al. ............ 33/379 X
5,025,568  6/1991  Grimes ........................ 33/384 X

FOREIGN PATENT DOCUMENTS 2564580  11/1985  France ........................ 33/390

*Primary Examiner*—Alvin Wirthlin
*Attorney, Agent, or Firm*—Friedrich Kueffner

[57] ABSTRACT

An arrangement for aligning an apparatus unit with respect to the direction of gravity. The arrangement includes a first support device, a second support device and a third support device acting on a first support point, a second support point, and a third support point, respectively, of the apparatus unit. A measuring level serves to control the alignment of the apparatus unit. The first and second support devices are vertically adjustable. The three support points are arranged in the corners of a triangle. Two separate optically distinguishable partial areas are marked in the region of the measuring level, wherein the first partial area is intersected by a plane through the center of the measuring level extending perpendicularly to the line connecting the first support point and the third support point, and wherein the second partial area is intersected by a plane through the center of the measuring level extending perpendicularly to the line connecting the second support point and the third support point.

10 Claims, 2 Drawing Sheets

ARRANGEMENT FOR ALIGNING AN APPARATUS UNIT

BACKGROUND OF THE INVENTION

1. Field of the Invention

The present invention relates to an arrangement for aligning an apparatus unit with respect to the direction of gravity. The arrangement includes a first support device, a second support device and a third support device acting on a first support point, a second support point, and a third support point, respectively, of the apparatus unit. The arrangement further includes a measuring level serving for controlling the alignment of the apparatus unit. The first and second support devices are adjustable, so that the positions of the first and second support points are adjustable in the direction of gravity. The three support points are arranged in the corners of a triangle.

2. Description of the Related Art

Arrangements of the above-described type are frequently used in the state of the art for aligning balances, geodetic devices or similar measuring devices. The air bubble in the measuring level is in the center of the measuring level when the apparatus unit is aligned. The desired alignment of the apparatus unit with respect to the direction of gravity is generally obtained by iterative adjustment of the adjustable support devices. The sequence of operation is usually selected at random. This results in the disadvantage that the alignment of the apparatus unit may take a very long time. This disadvantage is particularly noticeable when the initial misalignment of the apparatus unit is great. This is because, in this case, the adjustment of the support device initially does not lead to a change of the position of the air bubble in the measuring level; in other words, initially no information at all is available as to whether the adjustment improves the alignment of the apparatus unit.

SUMMARY OF THE INVENTION

Therefore, it is the primary object of the present invention to provide an arrangement of the above-described type which makes it possible to align an apparatus unit quickly and reliably with respect to the direction of gravity.

In accordance with the present invention, two separate optically distinguishable partial areas are marked in the region of the measuring level, wherein the first partial area is intersected by a plane through the center of the measuring level extending perpendicularly to the line connecting the first support point and the third support point, and wherein the second partial area is intersected by a plane through the center of the measuring level extending perpendicularly to the line connecting the second support point and the third support point.

The arrangement according to the present invention makes it possible that, during the alignment of the apparatus unit, information is available which subsequently shows which of the support devices must be adjusted for improving the alignment of the apparatus unit. If a straight line extending through the center of the measuring level and the center of the air bubble in the measuring level intersects the first or second partial area, the first or second support device, respectively, must be adjusted. As a result, the sequence of the operations for aligning an apparatus unit with such an arrangement is no longer selected at random and the desired alignment is achieved quickly and reliably.

The marked partial areas may be located within and/or outside of the measuring level.

For the allocation of the individual partial areas with respect to the support devices, it is advantageous if the two partial areas are different with respect to color. The allocation may either be suggestive, for example, by marking in red a partial area which indicates that a support device located on the right hand side of the apparatus unit to be aligned must be adjusted, or by providing the first or second support device with a color which corresponds to the color of the first or second partial area, respectively.

In accordance with a particularly preferred embodiment of the invention, at least one of the separate partial areas has two portions which are optically distinguishable. This makes it possible that, in addition to the information as to which support device is to be adjusted, information is available which indicates in which direction the respective support device is to be adjusted. Consequently, the alignment procedure of the apparatus unit can be further accelerated. In accordance with a particularly advantageous feature, the two portions belonging to one partial area have a surface configuration which is essentially mirror symmetrical with respect to a straight line extending perpendicularly to the vertical plane through the center of the measuring level and corresponding to the respective partial area.

For the allocation of the support devices with respect to the partial areas, it may additionally be advantageous if the first partial area has a first marking and the second partial area has a second marking which is different from the first marking. The allocation is further simplified if the first support device has a marking which coincides with the marking of the first partial area and the second support device has a marking which coincides with the marking of the second partial area.

The various features of novelty which characterize the invention are pointed out with particularity in the claims annexed to and forming a part of the disclosure. For a better understanding of the invention, its operating advantages, specific objects attained by its use, reference should be had to the drawing and descriptive manner in which there are illustrated and described a preferred embodiment of the invention.

DETAILED DESCRIPTION OF THE PREFERRED EMBODIMENTS

Figure 1:
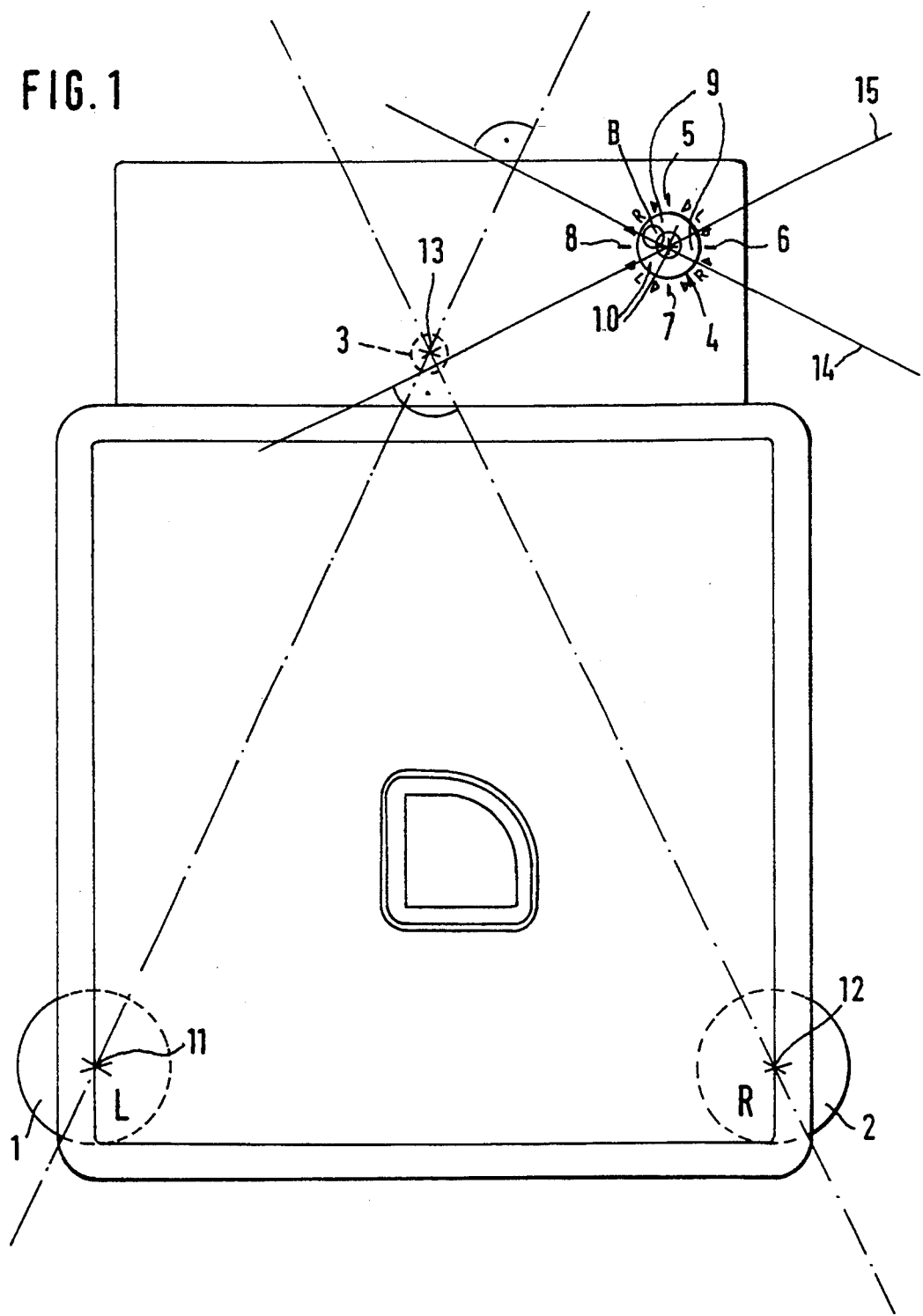
FIG. 1 is a schematic illustration of a balance equipped with the arrangement according to the present invention.

The balance schematically illustrated in FIG. 1 of the drawing is supported at three support points 11, 12 and 13 by three support devices 1, 2 and 3, respectively. The support points are determined by the centers of the support surfaces where the support devices support the balance. The support points are arranged in the corners of a triangle. The support devices 1 and 2 each are composed of a base which is vertically adjustable by rotating the base. The support device 3 is composed of a non-adjustable base.

Figure 2:
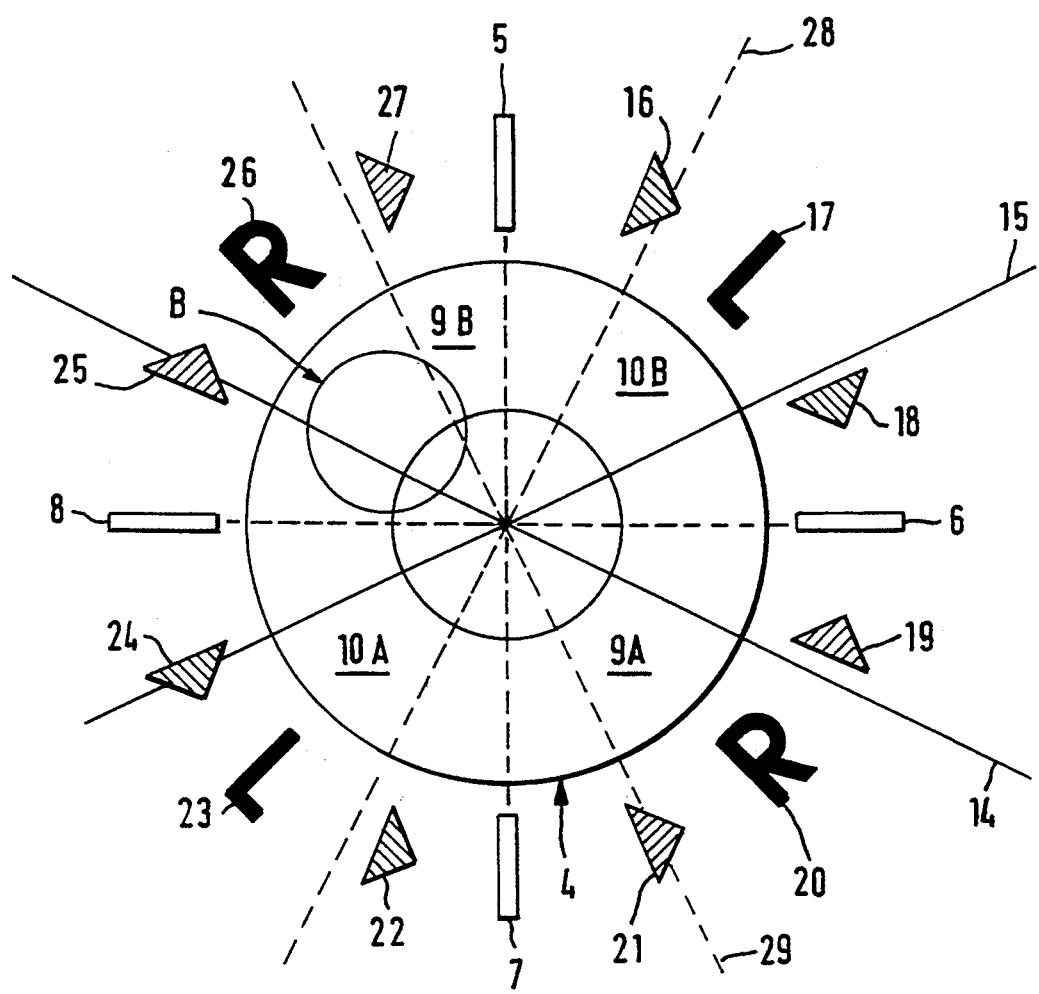
FIG. 2 is an enlarged view of the area of the measuring level of the balance of FIG. 1.

A measuring level 4 is arranged on the balance for controlling the alignment thereof with respect to the direction of gravity. In the region of the measuring level 4, as illustrated in more detail in FIG. 2, two optically distinguishable partial areas 9 and 10 are marked by markings 5, 6, 7 and 8. The partial area 9 is intersected by a plane 14 through the center of the measuring level extending perpendicularly through the straight line through the support points 11 and 13 and the partial area 10 is intersected by a plane 15 through the center of the measuring level extending perpendicularly to the straight line determined by the support points 12 and 13. As can be seen in FIG. 2, the partial areas 9 and 10 each have two also optically distinguishable portions 9A and 9B, and 10A and 10B, respectively. They are provided with markings 16 to 27.

The markings 16 to 27 indicate in which direction of rotation which adjustable base has to be rotated for improving the alignment of the balance with respect to the direction of gravity. For this purpose, the markings 20 and 26 in the partial area 9 differ from the markings 17 and 23 in the partial area 10. This difference makes it clear that the base 1 on the left hand side in FIG. 1 must be rotated if the center of the air bubble B in the measuring level is located in the partial area 10 and that the base 2 on the right hand side in FIG. 1 must be rotated if the center of the air bubble B in the measuring level is located in the partial area 9.

The arrow-shaped markings 19, 21, 25 and 27 in the portions 9A and 9B are arranged in such a way that they are essentially mirror symmetrical with respect to a straight line 28 extending perpendicularly to the plane 14, and the arrow-shaped markings 16, 18, 22 and 24 in the portions 10A and 10B are arranged in such a way that they are essentially mirror symmetrical with respect to a straight line 29 extending perpendicularly to the plane 15. As a result, an indication is provided which shows in which direction of rotation the bases are to be rotated. For example, if the center of the air bubble B in the measuring level is located in the portion 9B, the base 2 arranged on the right hand side of the balance in FIG. 1 must be rotated in clockwise direction. As a result, the balance is swung essentially about an axis determined by the support points 11 and 13. By rotating the base 2 in clockwise direction, the support point 12 is raised, so that the alignment of the balance is improved and the air bubble B is moved in the direction toward the center of the measuring level.

The sequence and direction in which the bases 1 and 2 must be rotated by aligning the balance is entirely determined as described above by means of the arrangement illustrated in the drawing. This makes it possible to align a balance provided with such an arrangement much more quickly.

The present invention is not limited to the embodiment illustrated in the drawing. For example, it is also possible to align other apparatus units with the arrangement according to the present invention. In addition, without deviating from the invention, it is possible to mark the partial areas in the region of the measuring level in different manners.

The invention is not limited by the embodiments described above which are presented as examples only but can be modified in various ways within the scope of protection defined by the appended patent claims.

I claim:

1. An arrangement for aligning an apparatus unit with respect to the direction of gravity, the arrangement comprising a first support device acting on a first support point of the apparatus unit, a second support device acting on a second support point of the apparatus unit, and a third support device acting on a third support point of the apparatus unit, a measuring level serving for controlling alignment of the apparatus unit, the measuring level having a center and containing a bubble having a center, whereby a displacement of the center of the bubble with respect to the center of the measuring level indicates an alignment status of the apparatus unit, the first and second support devices being adjustable support devices, such that the positions of the first and second support points are adjustable in the direction of gravity, wherein the three support points are arranged in the corners of a triangle, the arrangement further comprising two separate optically distinguishable partial areas marked at the measuring level, wherein the first partial area is intersected by a plane through the center of the measuring level extending perpendicularly to a line connecting the first support point and the third support point, and wherein the second partial area is intersected by a plane through the center of the measuring level extending perpendicularly to a line connecting the second support point and the third support point in order to indicate that, for improving the alignment status of the apparatus unit, the first support device requires adjustment when an imaginary straight line extending through the center of the bubble and the center of the measuring level intersects the first partial area and the second support device requires adjustment when an imaginary straight line extending through the center of the bubble and the center of the measuring level intersects the second partial area.

2. The arrangement according to claim 1, wherein the two partial areas are different with respect to color.

3. The arrangement according to claim 2, wherein the first support device has a color which coincides with the color of the first partial area and the second support device has a color which coincides with the color of the second partial area.

4. The arrangement according to claim 1, wherein at least a portion of one of the partial areas is located within the measuring level.

5. The arrangement according to claim 1, wherein at least a portion of one of the partial areas is located outside of the measuring level.

6. The arrangement according to claim 1, wherein at least one of the partial areas has two optically distinguishable portions.

7. The arrangement according to claim 6, wherein at least two of the optically distinguishable portions of one of the partial areas have a surface configuration which is essentially mirror symmetrical with respect to a straight line extending perpendicularly to the plane through the center of the measuring level and corresponding to the partial area.

8. The arrangement according to claim 1, wherein the first partial area comprises a first marking and the second partial area comprises a second marking which differs from the first marking.

9. The arrangement according to claim 8, wherein the first support device has a marking which coincides with the marking of the first partial area and the second support device has a marking which coincides with the marking of the second partial area.

10. The arrangement according to claim 1, wherein at least one of the adjustable support devices is an adjustable base.

* * * * *